United States Patent [19]
Greco

[11] Patent Number: 4,852,378
[45] Date of Patent: Aug. 1, 1989

[54] COUNTERBALANCE SPRING RETAINING MEANS FOR A ROLLER DOOR

[76] Inventor: Vincent Greco, 15-20 129th St., College Point, N.Y. 11356

[21] Appl. No.: 234,088

[22] Filed: Aug. 19, 1988

[51] Int. Cl.⁴ ............................................. B21D 51/16
[52] U.S. Cl. ........................................ 72/379; 160/191
[58] Field of Search ..................... 29/150; 72/335, 336, 72/337, 348, 368, 379; 160/309, 310, 312, 313, 315, 316, 318, 191

[56] References Cited

U.S. PATENT DOCUMENTS

| | | | |
|---|---|---|---|
| 1,278,404 | 9/1918 | Washburne | 160/313 |
| 1,433,881 | 10/1922 | Fancher et al. | 72/379 |
| 2,307,095 | 1/1943 | Zaferakis | 160/318 |
| 2,350,286 | 5/1944 | Michelman | 160/312 |
| 3,289,523 | 12/1966 | Kramer | 72/335 |

Primary Examiner—Lowell A. Larson
Attorney, Agent, or Firm—Myron Amer

[57] ABSTRACT

A spring retainer member of lightweight steel construction material formed in accordance with a method comprising the steps of die stamping a square blank of steel construction material, notching out triangular shapes at each of the midpoints between the four corners of the square blank to form between adjacent notches four radially oriented arms extending at 90 degrees to each other, die stamping a shaft-receiving hole centrally of the blank for the subsequent projection therethrough of a shaft, forming in an initial shaping step a cylindrical shape in the blank in the area of the shaft-receiving hole, and forming in a subsequent shaping step a completed cylindrical shape by bending the four arms into adjacent position to each other incident to closing the previously removed triangular shaped notches, whereby the resulting spring retainer member is adapted to be disposed on a shaft of an overhead door mechanism and attached to an end of a counterbalance spring and to a drum support of the overhead door mechanism.

2 Claims, 2 Drawing Sheets

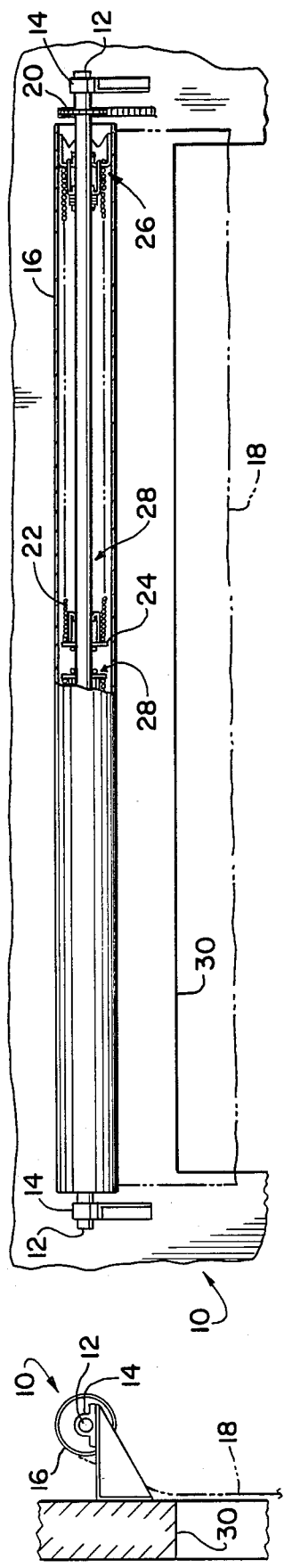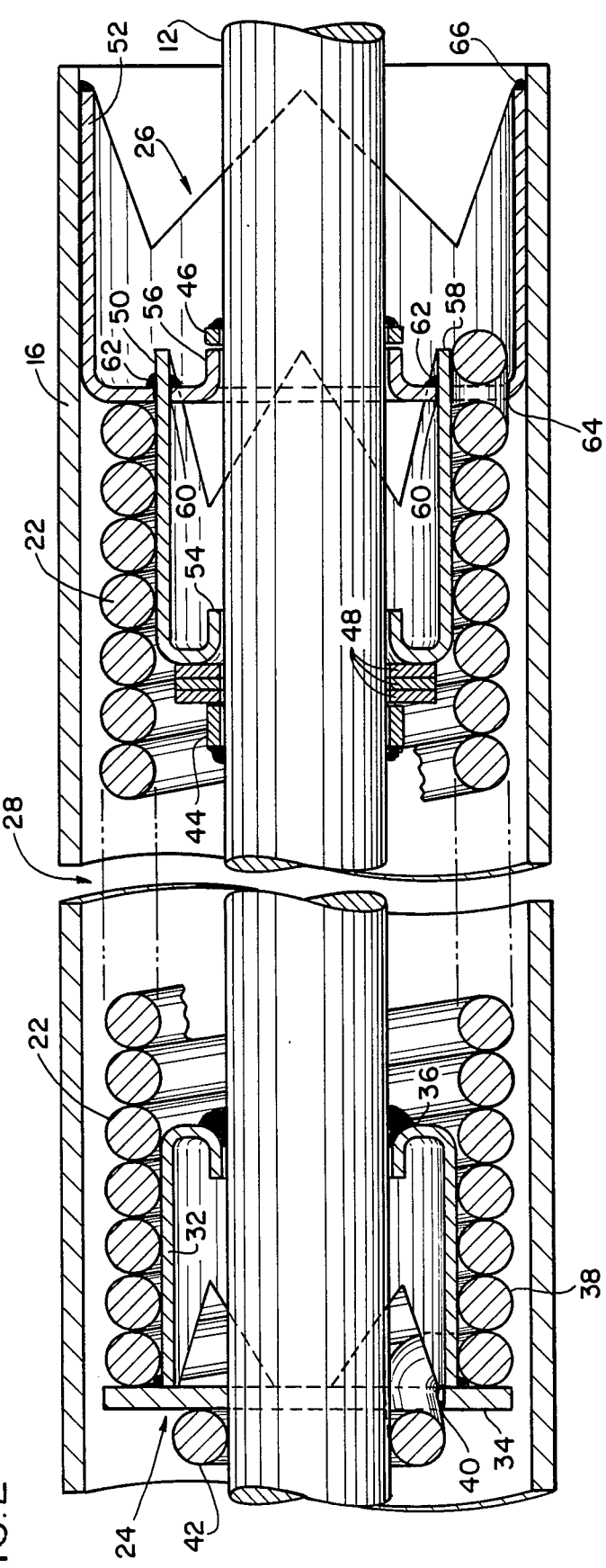

COUNTERBALANCE SPRING RETAINING MEANS FOR A ROLLER DOOR

The present invention relates to drive means for an overhead roller door, and more particularly to improvements in the components in these drive means which are attached to the opposite ends of a helical spring which is typically used to counterbalance the weight of the roller door.

The prior art practice is to use a casting process for the components or retainers for the opposite spring ends which, of course, results in heavy cast iron parts and, more significantly, in parts that because of their weight are difficult to handle. In properly setting up the counterbalance spring for its intended use (i.e. by imparting a pre-loaded torque to the spring so that the full weight of the door does burden the door-lifting mechanism), it is necessary to place the spring about the shaft, anchor one spring end to the shaft while tightening the spring by turning its opposite end preparatory to then fixing this end to the door-supporting drum, and then completing the assembly of the shaft and spring to the door-supporting drum and door-lifting and lowering mechanism. Thus the use of heavy cast iron spring retaining members, which is the current prior art practice, is a significant disadvantage because of all the handling required thereof during the setting up of the counterbalance spring, as above explained.

It is desirable to substitute for a heavy cast iron spring retaining member or part one that is structurally capable of resisting the torque imparted to the counterbalance spring, but made of a construction material that is lighter and easier to form in the shape required and, in this way, to correspondingly greatly facilitate the handling of these parts during the setting up of the counterbalance spring in the overhead roller door mechanism.

Heretofore parts other than the counterbalance spring retaining members were improved in their construction material and method of forming, but the specific counterbalance spring retainer components have persisted as cast iron parts, presumably because of the belief that the cast iron construction material was needed to provide the strength necessary to withstand the torque imparted to the counterbalance spring and otherwise to provide satisfactory service during use of the roller door.

EXAMPLES OF THE PRIOR ART

In U.S. Pat. No. 2,433,791 issued to Smith on Dec. 30, 1947, there is shown a universal shaft coupling comprised of three components, namely an intermediate member engaged from opposite directions by driving and driven extensions respectively of driving and driven shafts. The three components are not cast, but are "made of spring sheet material" (col 3, lines 5,6) and presumably are bent into the three dimensional configurations illustrated (FIG. 3). The improved construction material is confined to the universal shaft coupling however, and is not disclosed as being used for the counterbalance spring retaining members.

In U.S. Pat. No. 4,644,813 issued to Whitehouse et al on Feb. 28, 1987, there is disclosed a roller door drive assembly very similar to that involved herein in which the driving component is affixed to the drum of the door curtain and is a ring gear 9 37 preferably moulded from plastics material" (col. 2, line 3). An end plate 15 is included in the assembly and provides flanges 26 which are being into position after the ring gear has been presented to the end plate. (col. 2, lines 30-32). Thus, here also, components other than the spring retaining members are lightened in weight and manufactured by a more economical process, while the heavy, expensive and cumbersome spring retaining members are still permitted to impact adversely on the setting up and operation of the overhead roller door mechanism.

In the U.S. Pat. No. 4,405,040, issued on Sept. 20, 1987 to Buschbom, there is shown in FIG. 8 driving and driven members or so-called spiders 168 (driven) and 173 (drive) which from the description thereof at col. 6, starting in line 58, are each not cast, but are formed from steel as a die stamp. Each spider has four arms oriented laterally of a cylindrical body. The construction material and die-stamping process of these spiders 168, 173, however, are not recognized as being advantageous also to use for the counterbalance spring retaining members, and thus with respect to these specific components of a roller door mechanism the disclosure of this patent does not advance the prior art practice.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a front elevational view showing the present invention incorporated within an overhead roller door drive mechanism, in which the right portion of the drum 16 of said drive mechanism is broken away to illustrate internal structural features;

FIG. 2 is a left end view projected from FIG. 1;

FIG. 3 is a detail sectional view, on an enlarged scale, of the roller door drive mechanism as seen in FIG. 1.

Figure 4:
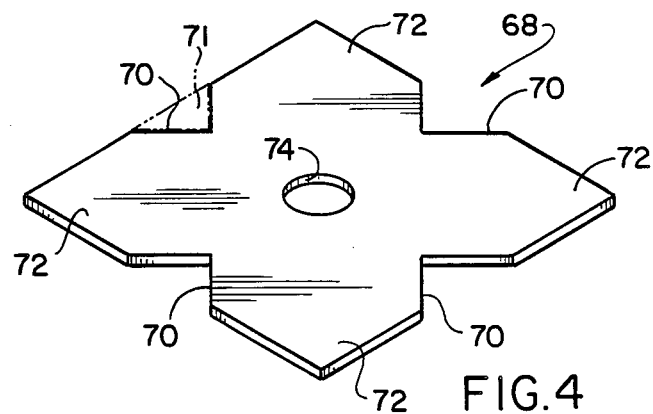
FIGS. 4-7 are perspective views showing in progressive sequence the forming of a spring end fitting 26 in accordance with the present invention.

A very popular type roller door drive 10 for raising and lowering interconnected rollers, slats or so-called curtain type doors and security screens is shown in FIG. 1. Drive 10 consists of a through shaft 12 suitably mounted at both ends, within bearings 14, above the door opening 30. Coaxially supported about shaft 12 is a hollow sleeve or drum 16 upon which curtain 18 is wound. Curtain 18 is guided in its vertical path along its outer edges by suitable tracks (not shown). At one end, a drive sprocket 20 is fixedly secured to shaft 12. Sprocket 20 may optionally have a manual or motor drive means (not shown) attached thereto for subsequent raising or lowering of curtain 18.

As generally understood, drum 16 is free to rotate relative to shaft 12 within the restrictive allowance of the winding and unwinding of a helical spring 22, for reasons which soon will be apparent. Spring 22 is connected to shaft 12 at its inboard end, i.e. centrally of the drum 16, by an anchor fitting 24. At the opposite or outboard end of spring 22, a connection is made to drum 16 through a fitting component 26 that serves as a combination bearing and spring retainer.

The above referred to parts 22, 24 and 26 comprise an energy accumulation and release system, herein generally designated 28, which is well known in the industry. As best illustrated in FIG. 2, when shaft 12 is driven clockwise, spring 22 will be understood to undergo winding of its coils so as to absorb energy and to develop sufficient torque so as to lift or cause ascending movement in the curtain 18. As the weight of curtain 18 is transferred onto drum 16 during ascent, spring 22 gradually releases energy in such a way as to compensate for the increasing build-up of the weight of curtain 18 on drum 16. Consequently, an input force which is constant, dispite the changing curtain weight, is required at sprocket 20. This result comes about due to a combination of interacting moment arms, spring constants, materials and inherent design factors, all of which is well understood and described in the patent literature, as for example in the patents issued to Smith, U.S. Pat. No. 2,433,791, Whitehouse, U.S. Pat. No. 4,644,813, and Buschbom, U.S. Pat. No. 4,405,040, which are incorporated herein by reference.

Although only a single torque spring arrangement 28 is shown in FIG. 1, a second spring arrangement is encircling relation about the first spring arrangement also be employed, wherein the two springs would be installed in concentric relation about shaft 12.

Thus far what has been described is well known in the prior art and is background to the present invention, which invention is the construction material used for, and the method of making the spring and fitting components 24 and 26, now to be described in detail. Formerly these components were made as heavy, expensive castings and their attachment to shaft 12 and drum 16 were correspondingly complicated as a result.

In FIG. 3, it is shown to the left that a formed cup 32 is attached by welding to a flanged lip 34 and, in turn, is welded to shaft 12 at its semiclosed end 36. A length 38 of spring 22 is threaded through a hole 40 in flange lip 34 and shaped into a single turn or coil 42 about shaft 12. This assembly provides a positive anchor or attachment of spring 22 to shaft 12.

At the opposite end of spring 22, use is made of the spring retainer fitting or assembly 26 which is coaxial with shaft 12 and held against lateral movement along shaft 12 by welded-in-place rings 44 and 46. A set of three washers 48 are provided to act as a thrust bearing for the retainer assembly 26. Assembly 26 is made up of a pair of small diameter cup 50 and slightly larger diameter cup 52, both of which have inturned lips 54 and 56 respectively to act as axial bearing surfaces. Extensions 58 on the smaller cup 50 are brought through matching slots 60 in the end wall of the larger cup 52 and then the two cups are welded together as shown, as at 62. Another selected length 38 of spring 22 is threaded through hole 64 in cup 52 and suitably anchored about the extensions 58, by welding or otherwise. The next assembly step contemplates that shaft 12 with its energy system 28 be enclosed within drum 16 and fastened by task welding or otherwise, as at 66.

What will now be described is the inventive technique for forming cups 32, 50 and 52, which technique or method is progressively shown in FIGS. 4–7. It will first be understood that the cups 50 and 52 are formed in an identical manner, the only difference being in the resulting diameter size of these cups which, in turn, is a function of the size of the steel blank which is the starting component for the cup-forming process. Thus, the process now to be described will be in reference to the larger cup 52, it being understood however that in all essential respects it is the same process used in forming the smaller cup 50.

First, and as shown in FIG. 4, a square blank 68 of a selected size is die stamped to provide the starting component for the forming process, the size as above noted being selected to end up with a cup shape of a desired diameter. The square blank 68 is notched at 70 to remove triangular shapes 71 (only one shown in phantom in FIG. 4) at a location which is the midpoint of each side, thereby achieving two method criterias. One is to form four radially oriented arms 72 in the blank 68 which, as will soon be described, are adapted to assume a cylindrical shape, not by being drawn which would be difficult, but by being bent out of the flat plane of the blank 68, which is a bending procedure that is readily easy to accomplish.

The second method criteria achieved by notching is to provide by the removed triangles 71 the necessary clearance to bend the arms 72 into adjacent position with each other in the completion of the cylindrical shape of the cup component 52, all as will soon be described.

Returning to a description of the cup-shaping process, after the notching of blank 68 it is contemplated die stamping centrally of the blank a shaft-receiving hole 74 through which will be projected the shaft of the overhead door mechanism, and thus the diameter size of the hole 74 is selected accordingly. In practice, the pierced diameter size of hole 74 is intentionally undersized with respect to the diameter of the shaft and this hole is then enlarged by drawing out the area and edge bounding the hole 74 and, by this drawing process, forming an inturned lip which is designated 74 in FIG. 7.

Figure 5:
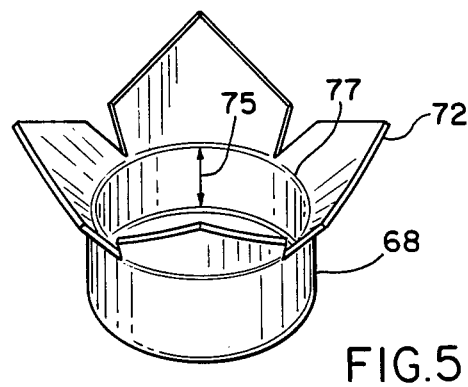
Figure 6:
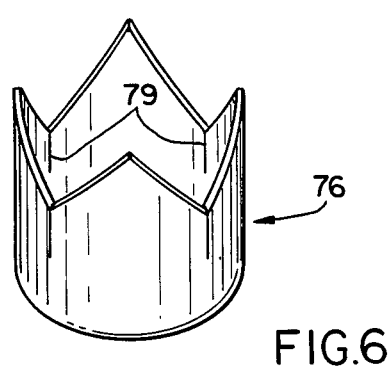

Blank 68 is then shaped into a cylinder in two stages, the first stage being illustrated in FIG. 5, and the second stage in FIG. 6. In the first stage of FIG. 5, the immediate area about the shaft-receiving hole 74 is left to remain in the flat plane of the blank 68 and thus provides an end wall or closed end 73 to the resulting cup (see FIG. 7), while the area of the blank immediately adjacent thereto is drawn out of the flat plane of blank 68 and is shaped into a cylinder 75, as shown in FIG. 5. The metallurgical process of drawing the steel construction material of the blank 68 from the flat into a cylindrical shape can only be achieved for a restricted dimension, and thus it will be understood that the axial size of the cylinder 75 is in practice only a third or less than the overall axial size of the final cylinder of FIG. 7.

To then provide the required axial size to the cup component 52 so it can function effectively as a counterbalance spring retainer member, the FIG. 5 configuration is then formed into the completed cylinder 76 of FIG. 6. Underlying the present invention is the recognition that in forming the partial cylindrical configuration of FIG. 5 into a completed cylinder as shown in FIG. 6, that this can be achieved not by drawing, but by merely bending the arms 72 about the bending circular line 77 into adjacent position with each other. This, it should be readily appreciated, is possible because of the clearance provided by the removed triangles 71 which triangles, as best shown in FIG. 6, are transformed into closed slots 79. The shaping or forming of the FIG. 6 cup 76 is then carried to the extent noted in FIG. 7.

Figure 7:
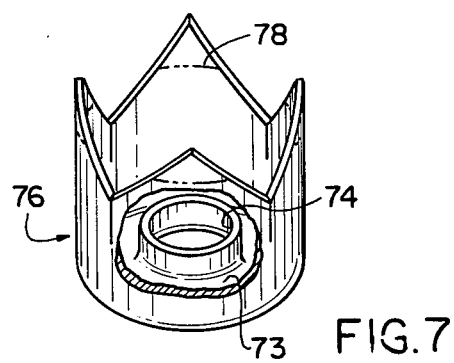

FIG. 7 is broken away to show the enlarging and the turning in of the edge bounding the center hole 74, the same being sized for a loose fit on shaft 12. In the case of the other inboard cup 32, it is necessary to cut away arms 72 along a line 78 (as shown in phantom in FIG. 7), before assembly of the cup to flange lip 34. Obviously cup 52 is made larger than either cups 50 or 32. Any further machining to form slots 60 or the spring anchor holes 40 and 64 is done in a conventional manner.

Both die-stamped fittings 24 and 26, comprised of steel suitable for die stamping and forming, afforded the user the advantages of a light weight, more economical and serviceable component for use within the roller door drive 10. More particularly, whereas the prior art cast iron spring retaining members typically weighed 15–20 pounds, the inventive fittings 24 and 26, because preferably made of press steel, $\frac{1}{8}$ inch thick, are but a fraction of this weight and are correspondingly much easier to adjust and handle during setting up of the torsion or counterbalance spring 22. Undoubtedly it was believed that the spring retaining members had to be of cast iron construction material to retain the torsion spring involved, which typically was 36 inches long, with 90 coils, and a wire diameter of between $\frac{3}{8}$ to $\frac{5}{8}$ of an inch, and required to develop a lifting torque for a door or curtain typically weighing 6 pounds per square foot. But surprisingly, this has been found not to be so, since in practice the lighter, steel members 24 and 26 perform as well or better than the prior art members.

While the particular counterspring retaining members and their manufacturing method herein shown and disclosed in detail are fully capable of attaining the objects and providing the advantages hereinbefore stated, it is to be understood that they are merely illustrative of the presently preferred embodiments of the invention and that no limitations are intended to the detail of construction or design herein shown other than as defined in the appended claims.

What is claimed is:

1. For use in winding and thereafter retaining in said wound condition a counterbalance spring for an overhead door mechanism, a spring retainer member of lightweight steel construction material formed in accordance with a method comprising the steps of die stamping a square blank of said steel construction material, notching out triangular shapes at each of the midpoints between the four corners of said square blank to form between adjacent notches four radially oriented arms extending at 90 degrees to each other, die stamping a shaft-receiving hole centrally of said blank for the subequent projection therethrough of a shaft, forming in an initial shaping step a cylindrical shape in said blank in the area thereof about said shaft-receiving hole, and forming in a subequent shaping step a completed cylindrical shape by bending said four arms into adjacent position to each other incident to closing the previously removed triangular shaped notches, whereby said resulting spring retainer member is adapted to be disposed on a shaft of said overhead door mechanism and attached to an end of said counterbalance spring and to a drum support of said overhead door mechanism and functions as a replacement for a prior art cast iron spring retainer member.

2. The method of forming an overhead door counterbalance spring retainer member as claimed in claim 1 including the step of removing the tips of said four arms to provide a spring retainer member adapted to be attached only to the shaft and used for the opposite end of the counterbalance spring.

* * * * *